US010235746B2

(12) United States Patent
Jung et al.

(10) Patent No.: US 10,235,746 B2
(45) Date of Patent: Mar. 19, 2019

(54) METHOD AND DEVICE FOR FUSING PANCHROMATIC IMAGE AND INFRARED IMAGE

(71) Applicant: University of Seoul Industry Cooperation Foundation, Seoul (KR)

(72) Inventors: Hyung Sup Jung, Seoul (KR); Sung Hwan Park, Gyeonggi-do (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 168 days.

(21) Appl. No.: 15/611,943

(22) Filed: Jun. 2, 2017

(65) Prior Publication Data

US 2017/0358067 A1    Dec. 14, 2017

Related U.S. Application Data

(63) Continuation of application No. PCT/KR2015/012742, filed on Nov. 26, 2015.

(30) Foreign Application Priority Data

Dec. 2, 2014    (KR) ........................ 10-2014-0170229

(51) Int. Cl.
*G06K 9/00* (2006.01)
*G06T 5/50* (2006.01)
(Continued)

(52) U.S. Cl.
CPC .............. *G06T 5/50* (2013.01); *G06T 3/4061* (2013.01); *G06T 5/003* (2013.01); *G06T 5/20* (2013.01);
(Continued)

(58) Field of Classification Search
None
See application file for complete search history.

(56) References Cited

FOREIGN PATENT DOCUMENTS

| KR | 10-1104199 | 4/2010 |
|---|---|---|
| KR | 10-1051716 | 11/2010 |
| KR | 10-1291219 | 3/2012 |

OTHER PUBLICATIONS

"The Comparative Analysis of Image Fusion Results by Using KOMPSAT-2/3 Images", Journal Kor. Soc. Surv., Geo., Photo., Cart., vol. 32, No. 2, pp. 117-132 (2014).

(Continued)

*Primary Examiner* — Stephen P Coleman
(74) *Attorney, Agent, or Firm* — Mintz Levin Cohn Ferris Glovsky and Popeo, P.C.; Kongsik Kim; Derek E. Constantine

(57) ABSTRACT

Disclosed herein are a method and apparatus for fusing a panchromatic image and an infrared image. The apparatus includes: an image acquisition unit configured to acquire a panchromatic image and an infrared image having the same coordinate system; a filtering unit configured to generate a low-frequency panchromatic image by performing low-frequency filtering on the panchromatic image, and to generate a high-frequency panchromatic image by subtracting the low-frequency panchromatic image from the panchromatic image; an image correction unit configured to generate a corrected high-frequency panchromatic image, to construct a linear regression equation, and to generate a corrected infrared image by using the constructed linear regression equation; a scaling factor determination unit configured to determine the ratio at which the panchromatic image and the infrared image are fused together; and a fused image generation unit configured to generate a fused image through multiplication and addition.

15 Claims, 7 Drawing Sheets

(51) Int. Cl.
  *G06T 3/40* (2006.01)
  *G06T 5/00* (2006.01)
  *G06T 5/20* (2006.01)
  *H04N 5/232* (2006.01)
  *H04N 5/33* (2006.01)
  *H04N 9/04* (2006.01)

(52) U.S. Cl.
  CPC ......... *H04N 5/23232* (2013.01); *H04N 5/332* (2013.01); *H04N 9/045* (2013.01); *G06T 2207/10041* (2013.01); *G06T 2207/10048* (2013.01); *G06T 2207/20221* (2013.01); *G06T 2207/20224* (2013.01); *G06T 2207/30184* (2013.01); *G06T 2207/30188* (2013.01)

(56) References Cited

OTHER PUBLICATIONS

"Comparison of Image Fusion Methods to Merge KOMPSAT-2 Panchromatic and Multispectral Images", www.researchgate.net/publication, Feb. 2012.

FIG. 5
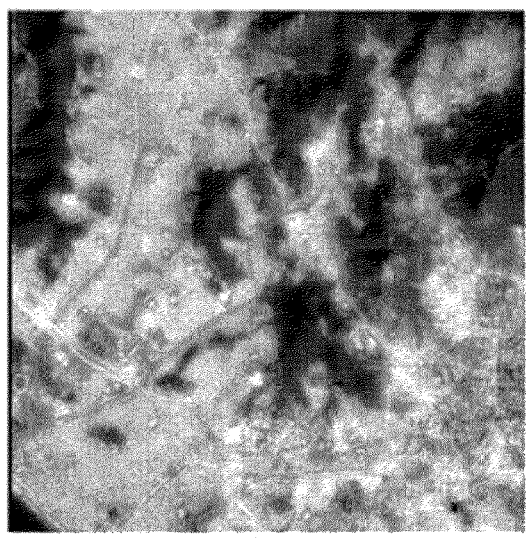
(a)
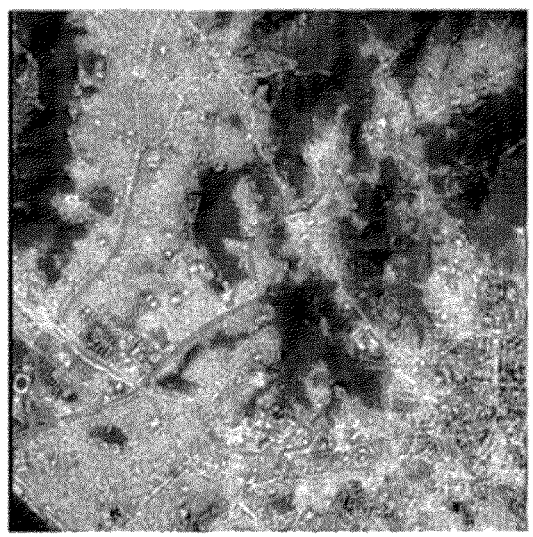
(b)
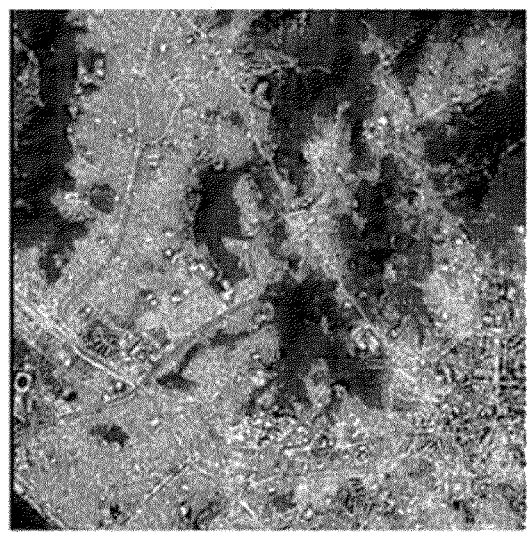
(c)
(d)

FIG. 6
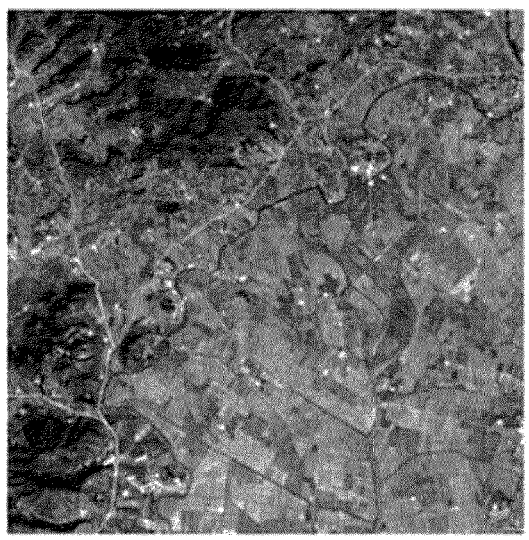
(a)
(b)
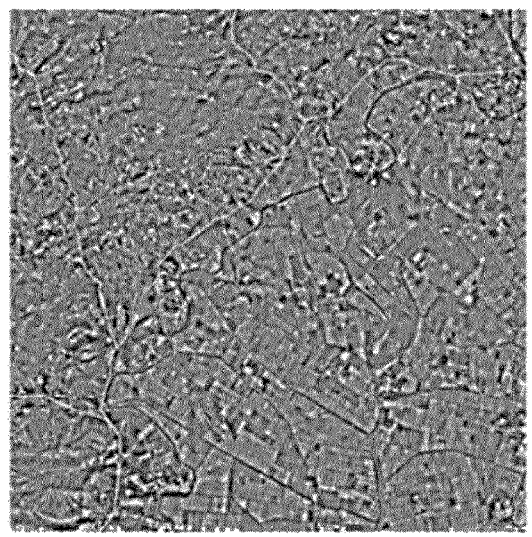
(c)
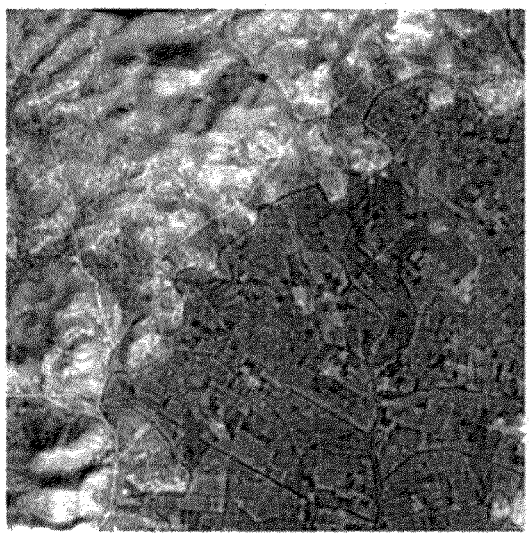
(d)

FIG. 7
(a)
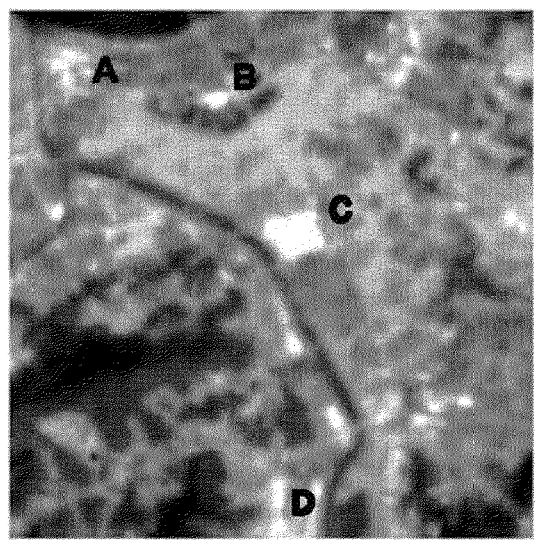
(b)
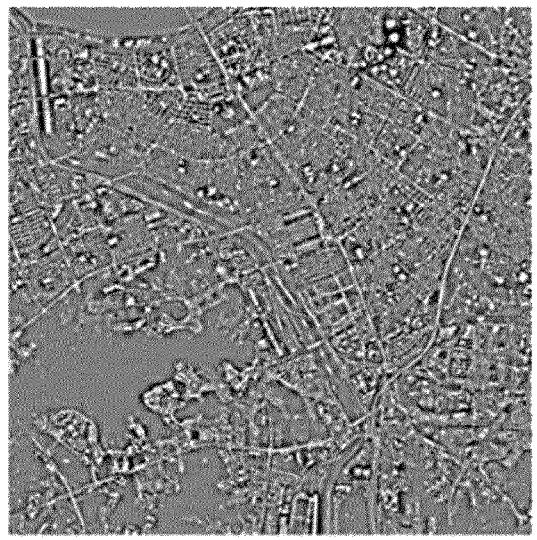
(c)
(d)

METHOD AND DEVICE FOR FUSING PANCHROMATIC IMAGE AND INFRARED IMAGE

CROSS-REFERENCE TO RELATED APPLICATION

This application is a continuation of PCT/KR2015/012742 filed on Nov. 26, 2015, which claims priority to Korean Application No. 10-2014-0170229 filed on Dec. 2, 2014, which application is incorporated herein by reference.

TECHNICAL FIELD

The present invention relates to a method and apparatus for fusing a panchromatic image and an infrared image, and more specifically to a method and apparatus for fusing a panchromatic image and an infrared image, which are capable of acquiring a high-resolution infrared image by fusing a panchromatic image and an infrared image.

The present invention was derived from the research conducted as a part of the Core Space Technology Development Project sponsored by the Korean Ministry of Science, ICT and Future Planning and the National Research Foundation of Korea [Project Serial Number: 1711014307; Project Name: Development of Heterogeneous Image Fusion Pre-processing Algorithm].

BACKGROUND ART

Data fusion in image systems refers to a technique which generates a single image by mathematically fusing respective pieces of image information photographed by multiple sensors, and is a technology which is capable of overcoming the limitation of image information provided by a single sensor. The development of data fusion began in earnest from the early 1990s with the active use of earth observation satellites. It has been explored by the research institutes of various countries, and has resulted in the development of technology optimized for Korea Multi-purpose Satellites (KOMPSAT)-2 and -3 and research into utilization in the field of earth science.

Generally, optical satellites provide both a high-resolution panchromatic image and a low-resolution multispectral image. A panchromatic image is advantageous to object extraction and reading due to the provision of high-resolution image information, whereas a multispectral image is advantageous to land coverage classification through the analysis of the spectral characteristics of objects due to its high spectral resolution. Although it is effective to provide a high-resolution multispectral image in order to achieve ideal use, spatial resolution and spectral resolution are in a trade-off relationship, and thus it is physically difficult to provide a high-resolution multispectral image. Accordingly, an early data fusion technique was developed with the goal of generating a multispectral image having resolution forcibly increased by mathematically fusing a high-resolution panchromatic image and a low-resolution multispectral image photographed by the same optical satellite. This has achieved technical outcome via Korean Patent No. 10-1132272 entitled "Method of Generating Fused High-resolution Satellite Image by Using Fusion Coefficient Reflecting Spectral and Spatial Characteristics of Images," Korean Patent No. 10-1291219 entitled "Method and Apparatus for Fusing Panchromatic Image and Multispectral Image," etc.

However, a panchromatic image and a multispectral image provided by the optical satellite are photographed in a way similar to the way that a human views real world geographic features. Accordingly, they are advantageous to visibility and readability, but have limitations in terms of information about land surface characteristics, such as the temperature, roughness, water content, etc. of a land surface. The same is true of a fused image generated by fusing the above two images. Accordingly, recently, research has been conducted into the development of a data fusion technique capable of providing higher-level information by fusing pieces of information provided by different satellites.

In particular, the image information provided by an infrared image is acquired by imaging earth radiation energy, not solar radiation energy. An infrared image can be photographed at night. Since earth radiation energy can be converted into temperature, an infrared image is advantageous to metal/nonmetal detection, and thus can be widely used for military and civil fields, such as the field of object recognition including image classification, target detection, vegetation monitoring, soil moisture content extraction, etc. Earth radiation energy in the wavelength band from 8 to 15 $\mu$m is insignificant compared with solar radiation energy. According to the Stefan-Boltzmann law, earth radiation energy is 204 times less than solar radiation energy in the wavelength band from 0.4 to 2.5 $\mu$m, and thus it is difficult to acquire a high-resolution infrared image. Therefore, there is an urgent demand for the development of a technique for generating a fused high-resolution infrared image by using a high-resolution panchromatic image.

Meanwhile, Korean Patent No. 10-1051716 discloses a "multi-sensor image fusion method," including the steps of: acquiring first and second images of the same subject point by means of different photographing sensors; extracting feature points from the first image by means of a FACET-based filter, and extracting feature points from the second image by means of a Harris corner detector; determining a feature point pair, exceeding a threshold value, to be corresponding points by comparing the mutual information between a specific region based on the feature points of the first image and a specific region based on the feature points of the second image based on the feature points of the second image; converting the coordinate unit of the first image into the coordinate unit of the second image, wherein when the coordinate of a converted pixel is not an integer but a real number, bilinear interpolation designed to perform conversion into an integer-type coordinate is applied; and forming a single third image in which the first image and the second image have been registered with each other by placing the feature points of the first image and the feature points of the second image in a corresponding point relationship at the same locations.

This preceding technology is configured to extract feature points of each of a multispectral image and an infrared image and to generate a fused image through corresponding point determination and unit coordinate conversion. Although this preceding technology has the advantage of simultaneously showing the image information of an infrared image and the spectral information of a multispectral image, it has difficulty providing a high-resolution infrared image.

Furthermore, Korean Patent No. 10-1104199 discloses a "visible and infrared image signal fusion apparatus and method," including the steps of: registering a first input image from the outside based on a preset alignment parameter by means of a first image alignment unit; registering a second input image from the outside based on a preset alignment parameter by means of a second image alignment unit; correcting the gain and offset of the signal of the first input image having passed through the registering process by means of a first gain/offset correction unit; correcting the gain and offset of the signal of the second input image having passed through the registering process by means of a second gain/offset correction unit; generating a Laplacian pyramid for the signal of the first input image, whose gain and offset have been corrected, by means of a first Laplacian pyramid generation unit; generating a Laplacian pyramid for the signal of the second input image, whose gain and offset have been corrected, by means of a second Laplacian pyramid generation unit; receiving the generated Laplacian pyramids from the first and second Laplacian pyramid generation units by a low-band pass filter unit, and performing pyramid step-based low-band filtering; receiving the generated Laplacian pyramids from the first and second Laplacian pyramid generation units by a high-band pass filter unit, and performing pyramid step-based high-band filtering; and generating a fused image by using pyramid step-based Laplacian images filtered via the low-band pass filter unit and the high-band pass filter unit and processing step-based images by means of a fused image generation unit.

This preceding technology is configured to generate Laplacian pyramids, to extract high-frequency information present in a panchromatic image, and to inject the high-frequency information into an infrared image, thereby generating a fused image. Although this preceding technology has the advantage of effectively maintaining infrared image information, it is problematic in that processing speed is low, the boundaries of objects inside an image become ambiguous due to the high-frequency information of a panchromatic image, and an area where the spatial resolution of a fused image is considerably lower than the spatial resolution of a panchromatic image occurs due to a blurring phenomenon.

SUMMARY OF THE DISCLOSURE

An object of the present invention is to generate a high-resolution infrared image, maintaining the spatial resolution of a panchromatic image, by fusing a low-resolution infrared image and a high-resolution panchromatic image together.

An object of the present invention is to enable a user to freely generate a fused image by developing a scaling factor designed to control a trade-off relationship between the spatial resolution of a panchromatic image and the infrared information of an infrared image.

According to an aspect of the present invention, there is provided an apparatus for fusing a panchromatic image and an infrared image, the apparatus including: an image acquisition unit configured to acquire a panchromatic image and an infrared image having the same coordinate system; a filtering unit configured to generate a low-frequency panchromatic image by performing low-frequency filtering on the panchromatic image, and to generate a high-frequency panchromatic image by subtracting the low-frequency panchromatic image from the panchromatic image; an image correction unit configured to generate a corrected high-frequency panchromatic image by correcting the pixel values of the high-frequency panchromatic image outside a confidence interval, to construct a linear regression equation from the average and standard deviation of the infrared image and the average and standard deviation of the low-frequency panchromatic image, and to generate a corrected infrared image by using the constructed linear regression equation; a scaling factor determination unit configured to determine the ratio at which the panchromatic image and the infrared image are fused together; and a fused image generation unit configured to generate a fused image by multiplying the corrected high-frequency panchromatic image by the determined scaling factor and by adding the result of the multiplication to the corrected infrared image.

According to an aspect of the present invention, there is provided a method of fusing a panchromatic image and an infrared image, the method including: an image acquisition step of acquiring a panchromatic image and an infrared image having the same coordinate system; a filtering step of generating a low-frequency panchromatic image by performing low-frequency filtering on the panchromatic image and generating a high-frequency panchromatic image by subtracting the low-frequency panchromatic image from the panchromatic image; an image correction step of generating a corrected high-frequency panchromatic image by correcting the pixel values of the high-frequency panchromatic image outside a confidence interval, constructing a linear regression equation from the average and standard deviation of the infrared image and the average and standard deviation of the low-frequency panchromatic image, and generating a corrected infrared image by using the constructed linear regression equation; a scaling factor determination step of determining the ratio at which the panchromatic image and the infrared image are fused together; and a fused image generation step of generating a fused image by multiplexing the corrected high-frequency panchromatic image by the determined scaling factor and adding the result of the multiplication to the corrected infrared image.

BRIEF DESCRIPTION OF THE DRAWINGS

The above and other objects, features and advantages of the present invention will be more clearly understood from the following detailed description taken in conjunction with the accompanying drawings, in which:

FIG. 5 shows the results of fused images based on scaling factors determined via the method of fusing a panchromatic image and an infrared image according to the embodiment of the present invention;

FIG. 6 shows examples of a panchromatic image, infrared image, high-frequency panchromatic image, and finally generated fused image of an agricultural region acquired via the method of fusing a panchromatic image and an infrared image according to the embodiment of the present invention; and FIG. 7 shows examples of a panchromatic image, infrared image, high-frequency panchromatic image, and finally generated fused image of an urban region acquired via the method of fusing a panchromatic image and an infrared image according to the embodiment of the present invention.

DETAILED DESCRIPTION OF THE DISCLOSURE

Figure 1:
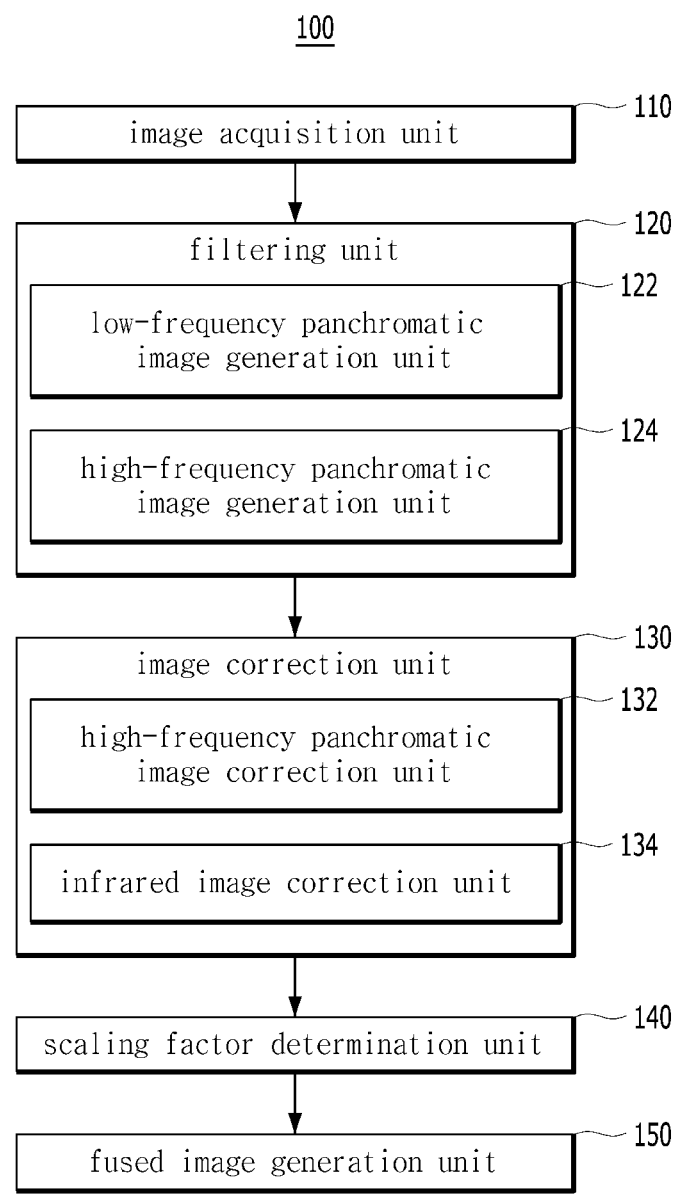
FIG. 1 is a diagram schematically showing the configuration of an apparatus for fusing a panchromatic image and an infrared image according to an embodiment of the present invention.

The terms and words used in the following specification and the claims should not be restrictively interpreted as having common and dictionary meanings, but should be interpreted as having meanings and concepts in conformity with the technical spirit of the present invention based on the principle that an inventor can appropriately define the concepts of terms in order to describe his or her invention in the best way.

Accordingly, since the embodiments described in the present specification and the configurations shown in the drawings merely correspond to embodiments of the present invention and do not cover all the technical spirit of the present invention, it should be appreciated that there may be various equivalents and modifications that may replace the configurations at the time at which the present application is filed.

The terms used herein will be used merely to describe embodiments, and are not intended to limit the present invention. A singular form may include a plural form unless otherwise defined. The terms, including "comprise," "includes," "comprising," "including" and their derivatives, specify the presence of described features, numbers, steps, operations, components, parts and/or combinations thereof, and do not exclude the possibility of the presence or addition of one or more other features, numbers, steps, operations, components, parts, and/or combinations thereof.

The embodiments of the present invention will be described in detail below with reference to the accompanying drawings. In the following description, a detailed description of a related known component or function that may unnecessarily make the gist of the present invention obscure will be omitted. Furthermore, in the following description of the embodiments of the present invention, specific numerical values are merely examples.

FIG. 1 is a diagram schematically showing the configuration of an apparatus for fusing a panchromatic image and an infrared image according to an embodiment of the present invention.

Referring to FIG. 1, the apparatus for fusing a panchromatic image and an infrared image according to the present invention includes an image acquisition unit 110, a filtering unit 120, an image correction unit 130, a scaling factor determination unit 140, and a fused image generation unit 150.

The image acquisition unit 110 acquires a panchromatic image and an infrared image which have the same coordinate system.

In other words, the image acquisition unit 110 is a unit configured to acquire a high-resolution panchromatic image and a low-resolution infrared image which are acquired by photographing a specific region. In this case, the corresponding geographic locations between the high-resolution panchromatic image and the low-resolution infrared image need to be the same by having the same coordinate system. In this case, co-registration is required when a panchromatic image and an infrared image are acquired via different payloads and thus the geographic coordinates of the images are different, and is not generally required when a panchromatic image and an infrared image are acquired via the same payload and thus the geographic coordinates of the images are the same.

For example, in the case of panchromatic and infrared images simultaneously photographed by currently operating Landsat-5, Landsat-7, or Landsat-8, the two images have substantially the same geographic locations, and thus a co-registration process is not generally required.

However, in the case of images photographed by different payloads at different times, for example, in the case in which an infrared image photographed by the Landsat-5, Landsat-7, or Lansat-8 and a panchromatic image photographed by the IKONOS, QuickBird, WorldView, KOMPSAT-2, or KOMPSAT-3 are fused together, the co-registration of the two images is required. Since co-registration is well known in the art to which the present invention pertains, a more detailed description thereof is omitted.

Figure 4:
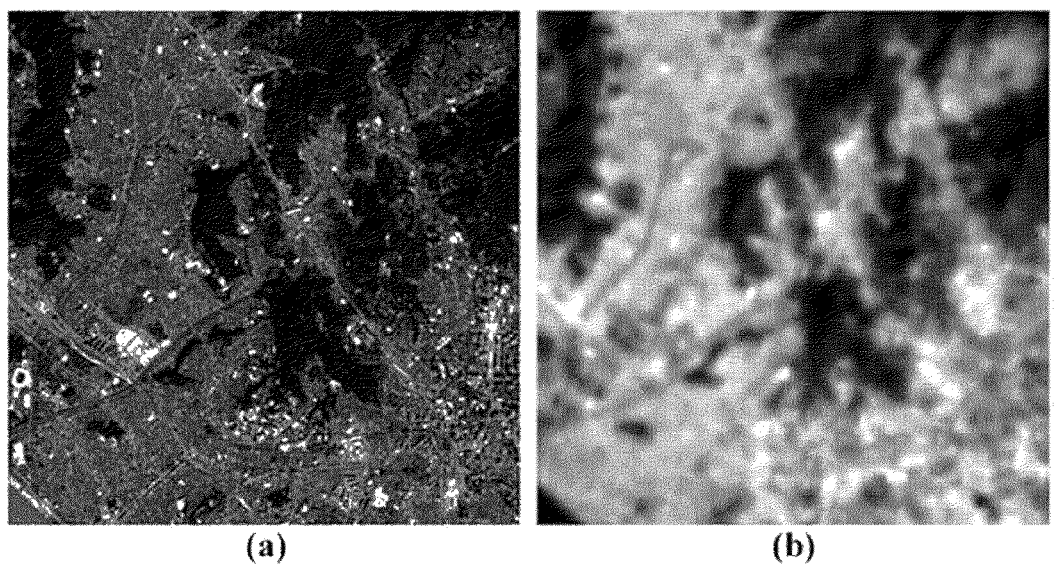
FIG. 4 shows a panchromatic image and an infrared image acquired via the method of fusing a panchromatic image and an infrared image according to the embodiment of the present invention.

Meanwhile, FIG. 4 shows a panchromatic image and an infrared image photographed by Landsat-8 according to the embodiment of the present invention. FIG. 4a shows the panchromatic image, which has a spatial resolution of 15 m. Accordingly, from this drawing, it can be seen that geographic features, such as roads, buildings, and the like, are represented in detail, and also it can be seen that most mountains and rivers have low reflectance and are represented as being dark but urban regions including buildings and the like have high reflectance and are represented as being bright. FIG. 4b shows the infrared image, which has a spatial resolution of 100 m. Accordingly, it is difficult to recognize the information of geographic features due to low resolution. It can be seen that urban areas including buildings and the like emit high radiation energy and are represented as being bright, but these bright areas are different from those in the panchromatic image. The reason for this is that methods for imaging the panchromatic and infrared images, respectively, are different in that solar radiation energy reflected from the surface of the earth is imaged in the case of the panchromatic image while terrestrial radiation energy emitted from the surface of the earth is imaged in the case of the infrared image.

The filtering unit 120 generates a low-frequency panchromatic image and a high-frequency panchromatic image through filtering.

In greater detail, the filtering unit 120 generates the low-frequency panchromatic image by performing low-frequency filtering on the panchromatic image. In this case, the low-frequency filtering is performed in a spatial domain, but may be performed in a frequency domain. Furthermore, when the low-frequency filtering is performed, (1) a block-averaging image is generated through the application of a window having a size of 8×8, and (2) the block-averaging image is interpolated to the size of the original panchromatic image by using bicubic interpolation, in order to take into account the magnitudes of the spatial resolution of the panchromatic image and the spatial resolution of the infrared image.

In this case, in the case of the process 1 of generating the block-averaging image, the size of the window is determined by taking into account the ratio between the spatial resolution of the panchromatic image and the spatial resolution of the infrared image.

Furthermore, the filtering unit 120 generates the high-frequency panchromatic image by subtracting the low-frequency panchromatic image, generated via the above-described process, from the original panchromatic image.

In greater detail, the original panchromatic image is composed of the summation of the low-frequency panchromatic image and the high-frequency panchromatic image, the low-frequency panchromatic image is generated through low-frequency filtering, and the high-frequency panchromatic image is generated by subtracting the low-frequency panchromatic image from the original panchromatic image. The high-frequency panchromatic image $I_{PAN}^{HP}(i, j)$ is acquired using Equation 1 below:

$$I_{PAN}^{HP}(i,j) = I_{PAN}(i,j) - I_{PAN}^{LP}(i,j) \quad (1)$$

In this equation, $I_{PAN}^{HP}(i, j)$ represents the high-frequency panchromatic image, and i and j represent an image coordinate in a pixel direction and an image coordinate in a line direction, respectively. Furthermore, $I_{PAN}(i, j)$ represents the original panchromatic image, and $I_{PAN}^{LP}(i, j)$ represents the low-frequency panchromatic image, which may be generated through low-frequency filtering.

The filtering unit 120 is a principal technology in the apparatus for fusing a panchromatic image and an infrared image according to the present invention, and, in greater detail, may include a low-frequency panchromatic image generation unit 122 and a high-frequency panchromatic image generation unit 124.

In other words, the filtering unit 120 may include the low-frequency panchromatic image generation unit 122 and the high-frequency panchromatic image generation unit 124. The low-frequency panchromatic image generation unit 122 generates the low-frequency panchromatic image by extracting only low-frequency components through low-frequency filtering, and the high-frequency panchromatic image generation unit 124 generates the high-frequency panchromatic image by subtracting the low-frequency panchromatic image from the original panchromatic image.

Accordingly, the low- and high-frequency panchromatic images generated via the low- and high-frequency panchromatic image generation units 122 and 124 of the filtering unit 120 are characterized by including the low- and high-frequency components of the original panchromatic image, respectively.

The image correction unit 130 generates a corrected high-frequency panchromatic image and a corrected infrared image by correcting the high-frequency panchromatic image generated via the filtering unit 120 and correcting the infrared image.

In other words, the image correction unit 130 generates the corrected high-frequency panchromatic image by correcting the values of pixels of the high-frequency panchromatic image outside a confidence interval, and generates the corrected infrared image by using the average and standard deviation of the low-frequency panchromatic image and the average and standard deviation of the infrared image.

In greater detail, the image correction unit 130 inspects whether each of the pixels of the high-frequency panchromatic image falls within the confidence interval, and corrects the value of the pixel to a corresponding threshold value when the pixel falls outside the confidence interval, thereby maintaining the spatial resolution of a finally generated fused image.

In this case, the confidence interval is generally set to a confidence level of 68%, 95%, or 99%, which refers to a standard deviation of 1, 2, or 3, respectively. The corrected high-frequency panchromatic image $\overline{I_{PAN}^{HP}}(i, j)$ is obtained using Equation 2 below:

$$\overline{I_{PAN}^{HP}}(i, j) = \begin{cases} -T_C \cdot \sigma_{PAN}^{HP}, & \text{if } I_{PAN}^{HP}(i, j) \leq -T_C \cdot \sigma_{PAN}^{HP} \\ +T_C \cdot \sigma_{PAN}^{HP}, & \text{if } I_{PAN}^{HP}(i, j) \geq +T_C \cdot \sigma_{PAN}^{HP} \\ I_{PAN}^{HP}(i, j), & \text{Others} \end{cases} \quad (2)$$

In this equation, $\overline{I_{PAN}^{HP}}(i, j)$ represents the corrected high-frequency panchromatic image, and $\sigma_{PAN}^{HP}$ represents the standard deviation of the high-frequency panchromatic image. Furthermore, $T_C$ is the Z value of a normal distribution, and has 1.96 or 2.58 when the value is estimated using a generally used confidence level of 95% or 99%, respectively.

For example, when the standard deviation of the high-frequency panchromatic image is 1 and the confidence interval is 95%, a corresponding pixel value is corrected to −1.96 when the pixel value is smaller than −1.96, a corresponding pixel value is corrected to 1.96 when the pixel value is larger than 1.96, and a corresponding pixel value is used without correction when the pixel value is larger than −1.96 and smaller than 1.96.

Furthermore, the image correction unit 130 calculates the average and standard deviation of the infrared image, calculates the average and standard deviation of the low-frequency panchromatic image, obtains a linear regression equation from these parameters, and corrects the infrared image by applying the linear regression equation to each of the pixels of the infrared image. Accordingly, the corrected infrared image and the low-frequency panchromatic image follow the same standard normal distribution, and the corrected infrared image $\overline{I_{TIR}}(i, j)$ is obtained using Equation 3 below:

$$\overline{I_{TIR}}(i, j) = \frac{\sigma_{PAN}^{LP}}{\sigma_{TIR}} \cdot (I_{TIR}(i, j) - \mu_{TIR}) + \mu_{PAN}^{LP} \quad (3)$$

In this equation, $\overline{I_{TIR}}(i, j)$ represents the corrected infrared image, $T_{TIR}(i, j)$ represents the original infrared image, $\sigma_{TIR}$ and $\sigma_{PAN}^{LP}$ represent the standard deviations of the infrared image and the low-frequency panchromatic image, respectively, and $\mu_{TIR}$ and $\mu_{PAN}^{LP}$ represent the average of the infrared image and the average of the low-frequency panchromatic image, respectively.

The image correction unit 130 is a principal technology in the apparatus for fusing a panchromatic image and an infrared image according to the present invention, and, in greater detail, may include a high-frequency panchromatic image correction unit 132 configured to correct the high-frequency panchromatic image in the image correction unit 130, and an infrared image correction unit 134 configured to correct the infrared image.

In other words, the image correction unit 130 may include the high-frequency panchromatic image correction unit 132 and the infrared image correction unit 134. The high-frequency panchromatic image correction unit 132 corrects the pixel values of the high-frequency panchromatic image outside the confidence interval, and the infrared image correction unit 134 corrects each of the pixel values of the infrared image so that the corrected infrared image and the low-frequency panchromatic image have the same standard normal distribution.

The scaling factor determination unit 140 determines the ratio at which the panchromatic image and the infrared image are fused together.

In other words, the scaling factor determination unit 140 determines the ratio at which the panchromatic image and the infrared image are fused together, and the ratio ranges from 0 to 1. When a scaling factor is 0, this means that the information of the infrared image is sufficiently maintained, but also means that the spatial resolution of the panchromatic image is not reflected. When the scaling factor is 1, this means that the spatial resolution of the panchromatic image is maximally reflected so that a fused image may have high resolution, but also means that the image information of the infrared image is rarely reflected.

In greater detail, the scaling factor determination unit 140 may be utilized as a factor which can control spatial resolution and spectral resolution which are in a trade-off relationship. Generally, since spatial resolution and spectral resolution are in a trade-off relationship, the thermal information of the infrared image is not represented in detail when the spatial resolution is increased. In contrast, when the spatial resolution is decreased, the thermal information of the infrared image is represented in detail, but a disadvantage arises in that it is not easy to identify objects, such as roads, buildings, and the like.

Accordingly, the ratio at which the spatial resolution of the panchromatic image and the thermal information of the infrared image are fused together may be determined by determining the scaling factor. The scaling factor ranges from 0 to 1. When the scaling factor is 0, the spatial resolution of the panchromatic image is not reflected, and thus a final fused image is generated in the state in which only the thermal information of the infrared image has been reflected. In contrast, when the scaling factor is 1, the spatial resolution of the panchromatic image is fully reflected and thus the spatial resolution of a final fused image may be increased, but reflectance information included in the panchromatic image may be reflected in the final fused image and may cause a problem, such as color distortion or the like.

Meanwhile, the scaling factor determined by the scaling factor determination unit 14 may be determined by a user based on the type of region (e.g., an urban region, a coastal region, an agricultural region, or the like), whose image is acquired, as desired.

Meanwhile, FIG. 5 shows final fused images which vary depending on the scaling factor according to the embodiment of the present invention. FIG. 5a shows a final fused image when the scaling factor is 0.25, FIG. 5b shows a final fused image when the scaling factor is 0.5, FIG. 5c shows a final fused image when the scaling factor is 0.75, and FIG. 5d shows a final fused image when the scaling factor is 1.

Referring to FIG. 5, it can be seen that the spatial resolution of the final fused image increases as the scaling factor increases, and also can be seen that the boundaries of a mountainous region, roads, buildings, and the like are represented in greater detail as the scaling factor increases. In contrast, it can be seen that the thermal information of the final fused image is not represented in detail as the scaling factor increases. In other words, regions represented as being bright in FIG. 5a are regions emitting relatively large amounts of terrestrial radiation energy, and correspond to urban regions. These regions become darker from FIG. 5a to FIG. 5d, and thus it can be seen that the capability of the infrared images to transfer thermal information becomes degraded.

The fused image generation unit 150 multiplies the corrected high-frequency panchromatic image generated via the image correction unit 130 by the scaling factor determined via the scaling factor determination unit 140, and adds the result of the multiplication to the corrected infrared image generated via the image correction unit 130, thereby generating a final fused image.

In other words, the fused image generation unit 150 generates the final fused image by multiplying each of the pixels of the corrected high-frequency panchromatic image generated via the image correction unit 130 by the scaling factor determined via the scaling factor determination unit 140 and then adding the result of the multiplication to the corresponding location pixel of the corrected infrared image generated via the image correction unit 130. The finally generated fused image $I_{TIR}^{FUS}(i, j)$ is acquired using Equation 4 below:

$$I_{TIR}^{FUS}(i,j)=\overline{I_{TIR}}(i,j)+\alpha \cdot \overline{I_{PAN}^{HP}}(i,j) \tag{4}$$

In this equation, $I_{TIR}^{FUS}(i, j)$ represents the finally generated fused image, $\overline{I_{TIR}}(i, j)$ represents the corrected infrared image generated via the image correction unit 130, α represents the scaling factor determined via the scaling factor determination unit 140, and $\overline{I_{PAN}^{HP}}(i, j)$ represents the corrected high-frequency panchromatic image generated via the image correction unit 130. Referring to Equation 4, the pixel values of the final fused image vary depending on the scaling factor determined via the scaling factor determination unit 140, and it can be seen that the high-frequency panchromatic image is reflected more as the scaling factor increases.

Meanwhile, FIG. 6 shows a final fused image of an agricultural region according to the embodiment of the present invention. FIG. 6a shows a panchromatic image, FIG. 6b shows an infrared image, FIG. 6c shows a high-frequency panchromatic image, and FIG. 6d shows the final fused image when the scaling factor is 0.5.

Referring to FIG. 6, FIG. 6a shows the panchromatic image, and it can be seen that the panchromatic image has high spatial resolution. FIG. 6b shows the infrared image, and it can be seen that although the infrared image has low spatial resolution, artificial features, such as roads, buildings, and the like, are represented as being bright and mountainous regions and a lake are represented as being dark. FIG. 6c shows the high-frequency panchromatic image generated by subtracting a low-frequency panchromatic image from the original panchromatic image, and it can be seen that information about the boundaries of agricultural regions, roads, water systems, and the like is represented in detail. FIG. 6d shows the final fused image generated by fusing the infrared image of FIG. 6b and the high-frequency panchromatic image of FIG. 6c, and it can be seen that an infrared image having high resolution may be provided because the infrared image sufficiently maintains thermal information provided via the infrared image of FIG. 6b and also maintains high spatial resolution provided via the high-frequency panchromatic image of FIG. 6c.

Meanwhile, FIG. 7 shows a final fused image of an urban region according to the embodiment of the present invention. FIG. 7a shows a panchromatic image, FIG. 7b shows an infrared image, FIG. 7c shows a high-frequency panchromatic image, and FIG. 7d shows the final fused image when the scaling factor is 0.5.

Referring to FIG. 7, FIG. 7a shows the panchromatic image, and it can be seen that the panchromatic image has high spatial resolution. Furthermore, it can be seen that most buildings are represented as regions having high reflectance, but also can be seen that mountainous regions, parks, and the like are represented as being dark. FIG. 7b shows the infrared image, and it can be seen that although the infrared image shows a brightness pattern similar to that of the panchromatic image of FIG. 7a, the infrared image has low spatial resolution. Marks A, B, C, and D in FIG. 7b indicate a complex shopping mall, an amusement park, a fish market, and an airport, respectively, and are represented as being bright. It can be seen that regions corresponding to marks A, B, C, and D are slightly different from corresponding regions in the panchromatic image of FIG. 7a. FIG. 7c shows the high-frequency panchromatic image generated by subtracting a low-frequency panchromatic image from the original panchromatic image, and it can be seen that information about the boundaries of roads, buildings, water systems, and the like is represented in detail. FIG. 7d shows a final fused image generated by fusing the infrared image of FIG. 7b and the high-frequency panchromatic image of FIG. 7c, and it can be seen that an infrared image having high resolution may be provided because the infrared image sufficiently maintains thermal information provided via the infrared image of FIG. 7b and also maintains high spatial resolution provided via the high-frequency panchromatic image of FIG. 7c. In particular, marks A (i.e., a complex shopping mall), B (i.e., an amusement park), C (i.e., a fish market), and D (i.e., an airport) having high heat information in FIG. 7b are represented as being bright in FIG. 7d.

Accordingly, the apparatus for fusing a panchromatic image and an infrared image according to the embodiment of the present invention may improve the spatial resolution of a low-resolution infrared image up to the level of that of a panchromatic image, and thus may be applied to image classification, target detection, object recognition, and the like in infrared images, which have been difficult to use due to their low accuracy.

Furthermore, the ratio at which the spatial resolution and thermal information of the final fused image are maintained may be set by controlling the scaling factor, and thus spatial resolution required for the type of a region whose image is acquired may be satisfied, thereby being appropriately used not only for an urban region but also for an agricultural region, a mountainous region, and the like.

A method of fusing a panchromatic image and an infrared image according to an embodiment of the present invention will be described in brief below based on the above detailed description.

Figure 2:
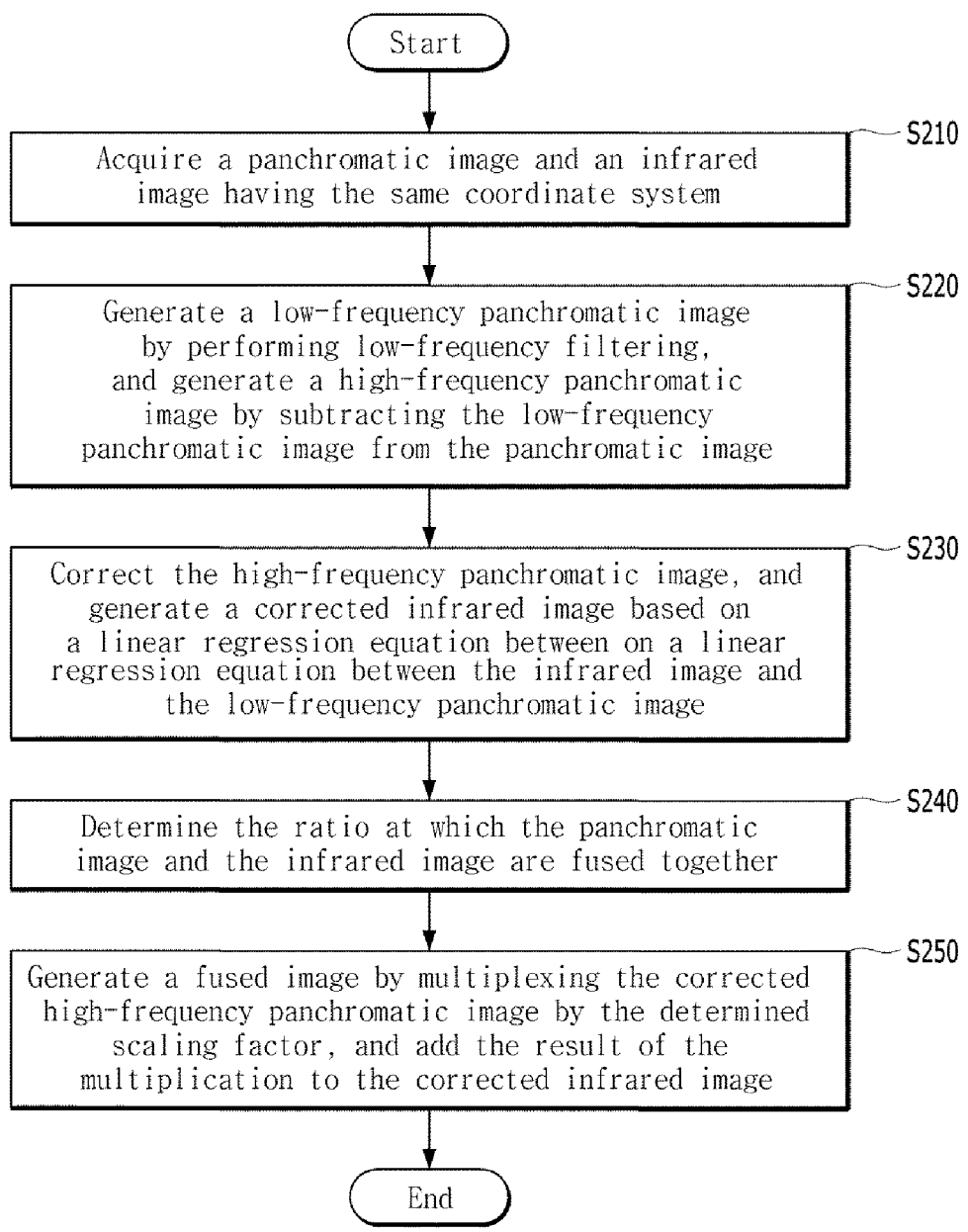
FIG. 2 is a flowchart showing a method of fusing a panchromatic image and an infrared image according to an embodiment of the present invention.

FIG. 2 is a flowchart showing the method of fusing a panchromatic image and an infrared image according to the embodiment of the present invention.

Figure 3:
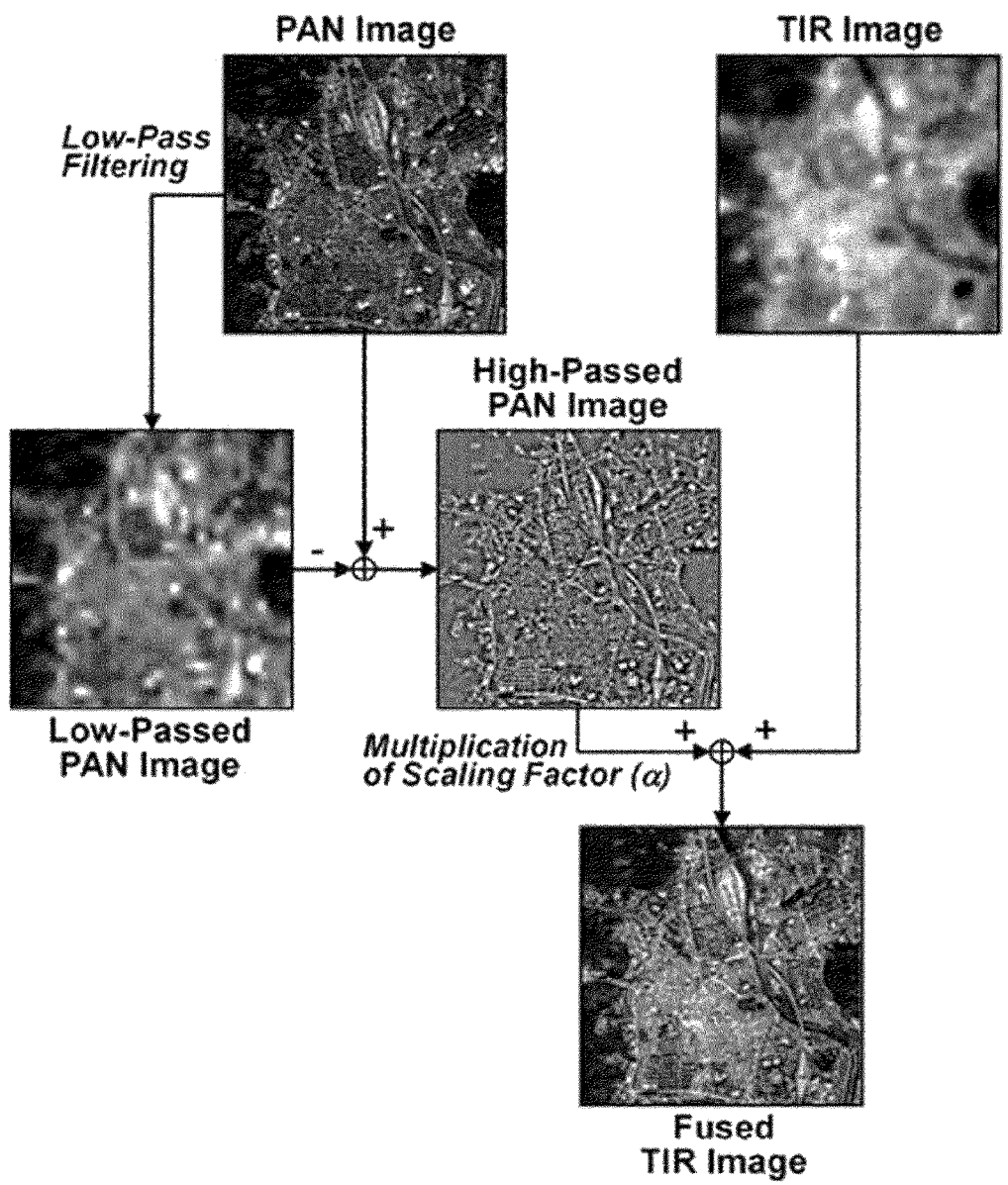
FIG. 3 shows the flow of the method of fusing a panchromatic image and an infrared image according to the embodiment of the present invention by means of images.

FIG. 3 illustrates the process flow of the method of fusing a panchromatic image and an infrared image according to the embodiment of the present invention.

Referring to FIG. 2, first, a panchromatic image and an infrared image having the same coordinate system are acquired via the image acquisition unit 110 at step S210.

In other words, a high-resolution panchromatic image and a low-resolution infrared image acquired by photographing a specific region are acquired via the image acquisition unit 110. In this case, the corresponding geographic locations between the high-resolution panchromatic image and the low-resolution infrared image need to be the same by having the same coordinate system.

In this case, co-registration designed to make the coordinate systems of respective images identical to each other is required when a panchromatic image and an infrared image are acquired via different payloads and thus the geographic coordinates of the images are different, and is not generally required when a panchromatic image and an infrared image are acquired via the same payload and thus the geographic coordinates of the images are the same.

For example, in the case of panchromatic and infrared images simultaneously photographed by currently operating Landsat-5, Landsat-7, or Landsat-8, the two images have substantially the same geographic locations, and thus a co-registration process is not generally required.

However, in the case of images photographed at different payloads at different times, for example, in the case in which an infrared image photographed by the Landsat-5, Landsat-7, or Lansat-8 and a panchromatic image photographed by the IKONOS, QuickBird, WorldView, KOMPSAT-2, or KOMPSAT-3 are fused together, the co-registration of the two images is required. Since co-registration is well known in the art to which the present invention pertains, a more detailed description thereof is omitted.

Next, a low-frequency panchromatic image and a high-frequency panchromatic image are generated through filtering via the filtering unit 120 at step S220.

In greater detail, the filtering unit 120 generates the low-frequency panchromatic image by performing low-frequency filtering on the panchromatic image. In this case, the low-frequency filtering is performed in a spatial domain, but may be performed in a frequency domain.

Furthermore, the filtering unit 120 may generate the low-frequency panchromatic image and the high-frequency panchromatic image through the following general procedures.

In other words, when the filtering unit 120 performs the low-frequency filtering, (1) the filtering unit 120 generates a block-averaging image through the application of a window having the size of 8×8, and (2) the filtering unit 120 performs a procedure configured to interpolate the block-averaging image to the size of the original panchromatic image by using bicubic interpolation.

In this case, in the case of the process 1 of generating the block-averaging image, the size of the window may be determined by taking into account the ratio between the spatial resolution of the panchromatic image and the spatial resolution of the infrared image.

Furthermore, the filtering unit 120 generates the high-frequency panchromatic image by subtracting the low-frequency panchromatic image, generated through the above processes, from the original panchromatic image.

In greater detail, the original panchromatic image is composed of the summation of the low-frequency panchromatic image and the high-frequency panchromatic image, the low-frequency panchromatic image is generated through low-frequency filtering, and the high-frequency panchromatic image is generated by subtracting the low-frequency panchromatic image from the original panchromatic image.

Step S220 of performing the filtering is a principal technology in the method of fusing a panchromatic image and an infrared image according to the present invention, and, in greater detail, may include the step of generation a low-frequency panchromatic image and the step of genera- tion a high-frequency panchromatic image.

Step S220 of performing the filtering may include the step of generation a low-frequency panchromatic image and the step of generation a high-frequency panchromatic image. The low-frequency panchromatic image is generated by extracting only low-frequency components through the low-frequency filtering, and the high-frequency panchromatic image is generated by subtracting the low-frequency panchromatic image from the original infrared image.

Accordingly, the low-frequency panchromatic image and the high-frequency panchromatic image generated through the steps of generating the low-frequency panchromatic image and the high-frequency panchromatic image of step S220 of performing the filtering include the low-frequency components and high-frequency components of the original panchromatic image, respectively.

Meanwhile, Equation 1 represents a method of generating a high-frequency panchromatic image. Since the detailed description thereof has been given above, it is referred to here.

Next, at step S230, the image correction unit 130 generates a corrected high-frequency panchromatic image and a corrected infrared image by correcting the high-frequency panchromatic image generated via the filtering unit 120 and the infrared image.

In other words, at step S230, the image correction unit 130 generates the corrected high-frequency panchromatic image by correcting the values of pixels of the high-frequency panchromatic image outside a confidence interval, and generates the corrected infrared image by using the average and standard deviation of the low-frequency panchromatic image and the average and standard deviation of the infrared image.

In greater detail, at step S230, the image correction unit 130 inspects whether the value of each of the pixels of the high-frequency panchromatic image falls within the confidence interval, and then corrects the value to a corresponding threshold value when the value falls outside the confidence interval, thereby maintaining the spatial resolution of a finally generated fused image.

In this case, the confidence interval is generally set to a confidence level of 68%, 95%, or 99%, which refers to a standard deviation of 1, 2, or 3, respectively.

Furthermore, at step S230, the image correction unit 130 calculates the average and standard deviation of the infrared image, calculates the average and standard deviation of the low-frequency panchromatic image, obtains a linear regression equation from these parameters, and corrects the infrared image by applying the linear regression equation to each of the pixels of the infrared image.

Step S230 of correcting the high-frequency panchromatic image and the infrared image is a principal technology in the method of fusing a panchromatic image and an infrared image according to the present invention, and may include a high-frequency panchromatic image correction step of correcting the high-frequency panchromatic image and an infrared image correction step of correcting the infrared image.

In other words, at step S230, the image correction unit 130 may perform the high-frequency panchromatic image correction step and the infrared image correction step. The pixel values of the high-frequency panchromatic image outside the confidence interval are corrected at the high-frequency panchromatic image correction step, and each of the pixel values of the infrared image is corrected at the infrared image correction step so that the corrected infrared image and the low-frequency panchromatic image have the same standard normal distribution.

Meanwhile, Equations 2 and 3 represent the method of correcting the high-frequency panchromatic image and the method of correcting the infrared image, respectively. Since the detailed descriptions thereof have been given above, they are referred to here.

Next, at step S240, the scaling factor determination unit 140 determines the ratio at which the panchromatic image and the infrared image are fused together.

In other words, at step S240, the scaling factor determination unit 140 determines the ratio at which the panchromatic image and the infrared image are fused together, and the ratio ranges from 0 to 1. When a scaling factor is 0, the information of the infrared image is sufficiently maintained, but the spatial resolution of the panchromatic image is not reflected. When the scaling factor is 1, a fused image may have high resolution by maximally reflecting the spatial resolution of the panchromatic image, but the image information of the infrared image is rarely reflected.

In greater detail, at step S240, the scaling factor determination unit 140 may be used as a factor configured to control spatial resolution and spectral resolution which are in a trade-off relationship. Generally, since spatial resolution and spectral resolution are in a trade-off relationship, the thermal information of the infrared image is not represented in detail when the spatial resolution is increased. However, when the spatial resolution is decreased, the thermal information of the infrared image is represented in detail, but a disadvantage arises in that it is not easy to identify objects, such as roads, buildings, and the like.

Accordingly, the ratio at which the spatial resolution of the panchromatic image and the thermal information of the infrared image are fused together may be determined through the determination of the scaling factor. The scaling factor ranges from 0 to 1. When the scaling factor is 0, the spatial resolution of the panchromatic image is not reflected, and the final fused image is generated in the state in which only the thermal information of the infrared image has been reflected. Furthermore, when the scaling factor is 1, the spatial resolution of the panchromatic image is fully reflected and thus the spatial resolution of the final fused image may be increased, but reflectance information included in the panchromatic image may be reflected in the final fused image, thereby causing a problem, such as color distortion or the like.

Meanwhile, the scaling factor determined via the scaling factor determination unit 14 at step S240 may be determined by a user based on the type of region (e.g., an urban region, a coastal region, an agricultural region, or the like), whose image is acquired, as desired.

Next, at step S250, the fused image generation unit 150 multiplies the corrected high-frequency panchromatic image by the scaling factor, and adds the result of the multiplication to the infrared image, thereby generating a final fused image.

In other words, at step S250 of generating a fused image, the final fused image may be generated by multiplying each of the pixels of the corrected high-frequency panchromatic image generated at step S230 by the scaling factor determined at step S240, and then adding the result fo the multiplication to the corresponding location pixel of the corrected infrared image generated at step S230.

Meanwhile, Equation 4 represents a method of generating the final fused image. The detailed description thereof has been provided above, and thus is not repeated here.

Accordingly, the method of fusing a panchromatic image and an infrared image proposed in the present invention may improve the spatial resolution of a low-resolution infrared image up to the level of that of a panchromatic image, and thus may be applied to image classification, target detection, object recognition, and the like in infrared images, which have been difficult to use due to low accuracy. Furthermore, the ratio at which the spatial resolution and thermal information of the final fused image are maintained may be set by controlling the scaling factor, and thus spatial resolution required for the type of a region whose image is acquired may be satisfied, thereby providing the effect of being appropriately used not only for an urban region but also for an agricultural region, a mountainous region, and the like.

The method of fusing a panchromatic image and an infrared image according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software.

Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

The present invention has the advantage of acquiring a high-resolution infrared image.

The present invention has the advantage of being capable of finally generating an infrared image, maintaining the high-resolution characteristic of a panchromatic image, by fusing the panchromatic image and an infrared image.

The present invention has the advantage of enabling a user to freely determine the ratio, at which a panchromatic image and an infrared image are fused together, through the control of a scaling factor.

The present invention can be widely applied to various fields related to the observation of information about the surface of the earth, and, in particular, has the advantage of being applied to military and civil fields, such as object recognition including image classification, target detection, vegetation monitoring, soil moisture content extraction, etc., due to its desirable metal/nonmetal detection capability.

In connection with foreign commercial satellite image processing software, there is a case where a technique for fusing a panchromatic image and a multispectral image is installed as a software module. The fundament technology of the present invention has the advantage of being installed in satellite image processing software to be developed in the future or being used as a new core technology for fusing a panchromatic image and an infrared image. Accordingly, the present invention has the advantage of contributing to the increased utilization of satellite images and the expansion of national satellite industry via the commercialization of fundamental technology.

The present invention can be applied to Landsat-5 and Landsat-7, i.e., representative earth observation satellites, and can be applied to Landsat-8, which was recently launched and is being successfully operated. Furthermore, the present invention has the advantage of maximizing the utilization of Korea Multi-purpose Satellite 3A (KOMPSAT-3A), i.e., a Korean first infrared satellite.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. An apparatus for fusing a panchromatic image and an infrared image, the apparatus comprising:
    an image acquisition unit configured to acquire a panchromatic image and an infrared image having a same coordinate system;
    a filtering unit configured to:
        generate a low-frequency panchromatic image by performing low-frequency filtering on the panchromatic image; and
        generate a high-frequency panchromatic image by subtracting the low-frequency panchromatic image from the panchromatic image;
    an image correction unit configured to:
        generate a corrected high-frequency panchromatic image by correcting pixel values of the high-frequency panchromatic image outside a confidence interval;
        construct a linear regression equation from an average and standard deviation of the infrared image and an average and standard deviation of the low-frequency panchromatic image; and
        generate a corrected infrared image by using the constructed linear regression equation;
    a scaling factor determination unit configured to determine a ratio at which the panchromatic image and the infrared image are fused together; and
    a fused image generation unit configured to generate a fused image by multiplying the corrected high-frequency panchromatic image by the determined scaling factor and adding a result of the multiplication to the corrected infrared image.

2. The apparatus of claim 1, wherein the filtering unit defines the high-frequency panchromatic image by using the following equation:

$$I_{PAN}^{HP}(i,j) = I_{PAN}(i,j) - I_{PAN}^{LP}(i,j)$$

where $I_{PAN}^{HP}(i, j)$ represents the high-frequency panchromatic image, i and j represent an image coordinate in a pixel direction and an image coordinate in a line direction, respectively, $I_{PAN}(i, j)$ represents the panchromatic image, and $I_{PAN}^{LP}(i, j)$ represents the low-frequency panchromatic image.

3. The apparatus of claim 1, wherein the filtering unit comprises:
    a low-frequency panchromatic image generation unit configured to generate the low-frequency panchromatic image by extracting only low-frequency components through the low-frequency filtering; and
    a high-frequency panchromatic image generation unit configured to generate the high-frequency panchromatic image by subtracting the low-frequency panchromatic image from the infrared image.

4. The apparatus of claim 1, wherein the image correction unit defines the corrected high-frequency panchromatic image by using the following equation:

$$\overline{I_{PAN}^{HP}}(i,j) = \begin{cases} -T_C \cdot \sigma_{PAN}^{HP}, & \text{if } I_{PAN}^{HP}(i,j) \leq -T_C \cdot \sigma_{PAN}^{HP} \\ +T_C \cdot \sigma_{PAN}^{HP}, & \text{if } I_{PAN}^{HP}(i,j) \geq +T_C \cdot \sigma_{PAN}^{HP} \\ I_{PAN}^{HP}(i,j), & \text{Others} \end{cases}$$

where $\overline{I_{PAN}^{HP}}(i, j)$ represents the corrected high-frequency panchromatic image, $\sigma_{PAN}^{HP}$ represents a standard deviation of the high-frequency panchromatic image, and $T_C$ is a Z value of a normal distribution, and is 1.96 or 2.58 when the value is estimated using a generally used confidence level of 95% or 99%, respectively.

5. The apparatus of claim 1, wherein the image correction unit defines the corrected infrared image by using the following equation:

$$\overline{I_{TIR}}(i, j) = \frac{\sigma_{PAN}^{LP}}{\sigma_{TIR}} \cdot (I_{TIR}(i, j) - \mu_{TIR}) + \mu_{PAN}^{LP}$$

where $\overline{I_{TIR}}(i, j)$ represents the corrected infrared image, $T_{TIR}(i, j)$ represents the infrared image before the correction has been performed, $\sigma_{TIR}$ and $\sigma_{PAN}^{LP}$ represent the standard deviation of the infrared image and the standard deviation of the low-frequency panchromatic image, respectively, and $\mu_{TIR}$ and $\mu_{PAN}^{LP}$ represent the average of the infrared image and the average of the low-frequency panchromatic image, respectively.

6. The apparatus of claim 1, wherein the image correction unit comprises:
a high-frequency panchromatic image correction unit configured to correct the pixel values of the high-frequency panchromatic image outside the confidence interval; and
an infrared image correction unit configured to correct pixel values of the infrared image so that the infrared image and the low-frequency panchromatic image have a same standard normal distribution.

7. The apparatus of claim 1, wherein the fused image generation unit defines the final fused image by using the following equation:

$$I_{TIR}^{FUS}(i,j) = \overline{I_{TIR}}(i,j) + \alpha \cdot \overline{I_{PAN}^{HP}}(i,j)$$

where $I_{TIR}^{FUS}(i, j)$ represents the finally generated fused image, $\overline{I_{TIR}}(i, j)$ represents the corrected infrared image generated via the image correction unit, $\alpha$ represents the scaling factor determined via the scaling factor determination unit, and $\overline{I_{PAN}^{HP}}(i, j)$ represents the corrected high-frequency panchromatic image generated via the image correction unit.

8. A method of fusing a panchromatic image and an infrared image, the method comprising:
an image acquisition step of acquiring a panchromatic image and an infrared image having a same coordinate system;
a filtering step of generating a low-frequency panchromatic image by performing low-frequency filtering on the panchromatic image and generating a high-frequency panchromatic image by subtracting the low-frequency panchromatic image from the panchromatic image;
an image correction step of generating a corrected high-frequency panchromatic image by correcting pixel values of the high-frequency panchromatic image outside a confidence interval, constructing a linear regression equation from an average and standard deviation of the infrared image and an average and standard deviation of the low-frequency panchromatic image, and generating a corrected infrared image by using the constructed linear regression equation;
a scaling factor determination step of determining a ratio at which the panchromatic image and the infrared image are fused together; and
a fused image generation step of generating a fused image by multiplexing the corrected high-frequency panchromatic image by the determined scaling factor and adding a result of the multiplication to the corrected infrared image.

9. The method of claim 8, wherein the filtering step comprises defining the high-frequency panchromatic image by using the following equation:

$$I_{PAN}^{HP}(i,j) = I_{PAN}(i,j) - I_{PAN}^{LP}(i,j)$$

where $I_{PAN}^{HP}(i, j)$ represents the high-frequency panchromatic image, i and j represent respective an image coordinate in a pixel direction and an image coordinate in a line direction, respectively, $I_{PAN}(i, j)$ represents the panchromatic image, and $I_{PAN}^{LP}(i, j)$ represents the low-frequency panchromatic image.

10. The method of claim 8, wherein the filtering step comprises:
a low-frequency panchromatic image generation step of generating the low-frequency panchromatic image by extracting only low-frequency components through the low-frequency filtering; and
a high-frequency panchromatic image generation step of generating the high-frequency panchromatic image by subtracting the low-frequency panchromatic image from the infrared image.

11. The method of claim 8, wherein the image correction step comprises defining the corrected high-frequency panchromatic image by using the following equation:

$$\overline{I_{PAN}^{HP}}(i, j) = \begin{cases} -T_C \cdot \sigma_{PAN}^{HP}, & \text{if } I_{PAN}^{HP}(i, j) \leq -T_C \cdot \sigma_{PAN}^{HP} \\ +T_C \cdot \sigma_{PAN}^{HP}, & \text{if } I_{PAN}^{HP}(i, j) \geq +T_C \cdot \sigma_{PAN}^{HP} \\ I_{PAN}^{HP}(i, j), & \text{Others} \end{cases}$$

where $\overline{I_{PAN}^{HP}}(i, j)$ represents the corrected high-frequency panchromatic image, $\sigma_{PAN}^{HP}$ represents a standard deviation of the high-frequency panchromatic image, and $T_C$ is a Z value of a normal distribution, and is 1.96 or 2.58 when the value is estimated using a generally used confidence level of 95% or 99%, respectively.

12. The method of claim 8, wherein the image correction step comprises defining the corrected infrared image by using the following equation:

$$\overline{I_{TIR}}(i, j) = \frac{\sigma_{PAN}^{LP}}{\sigma_{TIR}} \cdot (I_{TIR}(i, j) - \mu_{TIR}) + \mu_{PAN}^{LP}$$

where $\overline{I_{TIR}}(i, j)$ represents the corrected infrared image, $T_{TIR}(i, j)$ represents the infrared image before the correction has been performed, $\sigma_{TIR}$ and $\sigma_{PAN}^{LP}$ represent the standard deviation of the infrared image and the standard deviation of the low-frequency panchromatic image, respectively, and $\mu_{TIR}$ and $\mu_{PAN}^{LP}$ represent the average of the infrared image and the average of the low-frequency panchromatic image, respectively.

13. The method of claim 8, wherein the image correction step comprises:
a high-frequency panchromatic image correction step of correcting the pixel values of the high-frequency panchromatic image outside the confidence interval; and
an infrared image correction step of correcting pixel values of the infrared image so that the infrared image and the low-frequency panchromatic image have a same standard normal distribution.

14. The method of claim 8, wherein the fused image generation step comprises defining the final fused image by using the following equation:

$$I_{TIR}^{FUS}(i,j) = \overline{I_{TIR}}(i,j) + \alpha \cdot \overline{I_{PAN}^{HP}}(i,j)$$

where $I_{TIR}^{FUS}(i, j)$ represents the finally generated fused image, $\overline{I_{TIR}}(i, j)$ represents the corrected infrared image generated at the image correction step, α represents the scaling factor determined at the scaling factor determination step, and $\overline{I_{PAN}^{HP}}(i, j)$ represents the corrected high-frequency panchromatic image generated at the image correction step.

15. A computer-readable storage medium having stored thereon a computer program that, when executed by a processor, causes the processor to execute the method of claim 8.

* * * * *